US011968521B2

(12) United States Patent
Wey et al.

(10) Patent No.: US 11,968,521 B2
(45) Date of Patent: Apr. 23, 2024

(54) AUDIO APPARATUS AND METHOD OF CONTROLLING THE SAME

(71) Applicant: SAMSUNG ELECTRONICS CO., LTD., Suwon-si (KR)

(72) Inventors: Ho Seok Wey, Suwon-si (KR); Min Kim, Suwon-si (KR); Tae Woo Kim, Suwon-si (KR); Young Jo Seo, Suwon-si (KR); Sang-Il Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 575 days.

(21) Appl. No.: 17/267,354

(22) PCT Filed: Aug. 8, 2019

(86) PCT No.: PCT/KR2019/009980
§ 371 (c)(1),
(2) Date: Jul. 1, 2021

(87) PCT Pub. No.: WO2020/032624
PCT Pub. Date: Feb. 13, 2020

(65) Prior Publication Data

US 2023/0292079 A1 Sep. 14, 2023

(30) Foreign Application Priority Data

Aug. 10, 2018 (KR) ........................ 10-2018-0093575

(51) Int. Cl.
*H04S 3/00* (2006.01)
*H04S 7/00* (2006.01)

(52) U.S. Cl.
CPC .............. *H04S 7/307* (2013.01); *H04S 3/008* (2013.01); *H04S 2400/01* (2013.01); *H04S 2400/05* (2013.01)

(58) Field of Classification Search
CPC ...... H04S 7/307; H04S 3/008; H04S 2400/01; H04S 2400/05

(Continued)

(56) References Cited

U.S. PATENT DOCUMENTS

2010/0303246 A1 12/2010 Walsh et al.
2011/0150227 A1* 6/2011 Kim .................... G10L 21/0272 381/1
2011/0211702 A1 9/2011 Mundt et al.

FOREIGN PATENT DOCUMENTS

CN 102244805 A * 11/2011 ........... H04N 17/004
JP 200278100 A 3/2002

(Continued)

OTHER PUBLICATIONS

Communication dated Aug. 19, 2022 issued by the Korean Intellectual Property Office in Korean Patent Application No. 10-2018-0093575.

(Continued)

*Primary Examiner* — Carolyn R Edwards
*Assistant Examiner* — Friedrich Fahnert
(74) *Attorney, Agent, or Firm* — Sughrue Mion, PLLC

(57) ABSTRACT

An audio apparatus includes a signal receiver configured to receive a left-channel signal and a right-channel signal of a stereo audio signal; at least one filter configured to block a signal in a band exceeding a predetermined frequency based on the frequency bands of each of the received left-channel signal and right-channel signal; and a controller configured to generate a center-channel signal of the stereo audio signal based on the left-channel signal and the right-channel signal passing through the filter, to calculate a signal level sensitivity between the left-channel signal and the right-channel signal passing through the filter, to determine a similarity between the left-channel signal and the right-channel signal based on the calculated signal level sensitivity, and to (Continued)

control the generated center-channel signal to be output in response to the determined similarity.

11 Claims, 11 Drawing Sheets

(58) Field of Classification Search
USPC .......................................................... 381/303
See application file for complete search history.

(56) References Cited

FOREIGN PATENT DOCUMENTS

| | | | | | |
|---|---|---|---|---|---|
| JP | 3670562 | B2 * | 7/2005 | | |
| JP | 3670562 | B3 | 7/2005 | | |
| KR | 10-2013-0132971 | A | 12/2013 | | |
| KR | 10-1687085 | B1 | 12/2016 | | |
| WO | WO-2011039413 | A1 * | 4/2011 | ............... | H04S 5/00 |

OTHER PUBLICATIONS

International Search Report (PCT/ISA/210), dated Dec. 6, 2019 by International Searching Authority in International Application No. PCT/KR2019/009980.

Written Opinion (PCT/ISA/237) dated Dec. 6, 2019 by the International Searching Authority in International Application No. PCT/KR2019/009980.

* cited by examiner

AUDIO APPARATUS AND METHOD OF CONTROLLING THE SAME

TECHNICAL FIELD

The present disclosure relates to an audio apparatus and a method of controlling the same, and more particularly, to a method of generating a center channel for improving sound reproduction quality in a stereo audio apparatus.

BACKGROUND ART

In the modern society, various technologies for improving display performance and various technologies for improving the performance of an audio system compatible with a display are being developed.

As technologies for various types of display apparatuses have been developed and commercialized after conventional television broadcasting started, in addition to broadcasting received in real time, various types of contents such as Contents on Demand and movies may be provided through an external device such as PCs, external servers, or game consoles. A home theater system that can be enjoyed at home, in which a large and spacious theater has been moved to a master bedroom, is also being put into practical use, and the home theater system is also referred to as the audio system.

In general, the audio system includes a video device and an audio device, and the video device includes a television and a screen, and the audio device includes a 2-channel stereo audio apparatus, a multi-channel sound output apparatus such as 5.1 channels, and an audio receiver. In addition, a player for playing a reproducing media such as DVD/VCR may be connected. Among the audio apparatuses for TV sound, representative examples that can be installed in general homes are a stereo-channel audio system, a home theater audio system, and a sound-bar. The audio apparatus for TV sound uses a stereo audio channel composed of Left/Right channels as the most basic system.

Recently, researches to improve sound reproduction quality in the stereo-channel audio system have been actively conducted.

DISCLOSURE

Technical Problem

An aspect of the present disclosure is to improve sound reproduction quality by generating a center-channel signal in a stereo audio apparatus, and to reduce an amount of computation when generating the center-channel signal.

Technical Solution

An aspect of the disclosure provides an audio apparatus including: a signal receiver configured to receive a left-channel signal and a right-channel signal of a stereo audio signal; at least one filter configured to block a signal in a band exceeding a predetermined frequency based on the frequency bands of each of the received left-channel signal and right-channel signal; and a controller configured to generate a center-channel signal of the stereo audio signal based on the left-channel signal and the right-channel signal passing through the filter, to calculate a signal level sensitivity between the left-channel signal and the right-channel signal passing through the filter, to determine a similarity between the left-channel signal and the right-channel signal based on the calculated signal level sensitivity, and to control the generated center-channel signal to be output in response to the determined similarity.

The controller may be configured to generate the center-channel signal of the stereo audio signal based on an average value of a size of the left-channel signal passing through the filter and a size of the right-channel signal passing through the filter.

The controller may be configured to obtain envelope data of the left-channel signal based on the size of the left-channel signal passing through the filter, and to obtain envelope data of the right-channel signal based on the size of the right-channel signal passing through the filter.

The controller may be configured to convert data in which the size of the left-channel signal and the size of the right-channel signal passing through the filter changes over time into data having a predetermined signal size per unit time, and to obtain the envelope data of the left-channel signal and the envelope data of the right-channel signal.

The controller may be configured to calculate a difference value between the signal size by time of the envelope data of the left-channel signal and the signal size by time of the envelope data of the right-channel signal, to apply an absolute value to the calculated difference value, and to calculate the signal level sensitivity between the left-channel signal and the right-channel signal by smoothing the data to which the absolute value is applied according to a predetermined filtering coefficient.

The controller is configured to determine the similarity between the left-channel signal and the right-channel signal in response to the calculated signal level sensitivity; in response to the determined similarity being greater than or equal to a predetermined value, to control the generated center-channel signal to be output; and in response to the determined similarity being less than the predetermined value, to control the generated center-channel signal not to be output.

The controller may be configured to determine that the similarity between the left-channel signal and the right-channel signal is high or low according to the difference between the size of the left-channel signal and the size of the right-channel signal, and to determine that the similarity is low as the difference between the size of the left-channel signal and the size of the right-channel signal increases.

The at least one filter may include a low pass filter configured to block the signal in the band exceeding the predetermined frequency based on the frequency bands of each of the left-channel signal and the right-channel signal, and to pass a signal in a band below the predetermined frequency.

The audio apparatus method further include an output configured to output the received stereo audio signal.

The output may include a first output configured to outputting the left-channel signal of the stereo audio signal; a second output configured to output the right-channel signal of the stereo audio signal; and a third output configured to output the generated center-channel signal.

Another aspect of the disclosure provides a method of controlling an audio apparatus including:

receiving, by a signal receiver, a left-channel signal and a right-channel signal of a stereo audio signal; blocking, by a filter, a signal in a band exceeding a predetermined frequency based on the frequency bands of each of the received left-channel signal and right-channel signal; generating, by a controller, a center-channel signal of the stereo audio signal based on the left-channel signal and the right-channel signal passing through the filter;

calculating, by the controller, a signal level sensitivity between the left-channel signal and the right-channel signal passing through the filter; determining, by the controller, a similarity between the left-channel signal and the right-channel signal based on the calculated signal level sensitivity; and controlling, by the controller, the generated center-channel signal to be output in response to the determined similarity.

The generating of the center-channel signal of the stereo audio signal may include generating the center-channel signal of the stereo audio signal based on an average value of a size of the left-channel signal passing through the filter and a size of the right-channel signal passing through the filter.

The method may further include obtaining, by the controller, envelope data of the left-channel signal based on the size of the left-channel signal passing through the filter; and obtaining, by the controller, envelope data of the right-channel signal based on the size of the right-channel signal passing through the filter.

The obtaining of the envelope data may include converting data in which the size of the left-channel signal and the size of the right-channel signal passing through the filter changes over time into data having a predetermined signal size per unit time; and obtaining the envelope data of the left-channel signal and the envelope data of the right-channel signal.

The calculating of the signal level sensitivity between the left-channel signal and the right-channel signal passing through the filter may include calculating a difference value between the signal size by time of the envelope data of the left-channel signal and the signal size by time of the envelope data of the right-channel signal; applying an absolute value to the calculated difference value; and calculating the signal level sensitivity between the left-channel signal and the right-channel signal by smoothing the data to which the absolute value is applied according to a predetermined filtering coefficient.

The method may further include determining, by the controller, the similarity between the left-channel signal and the right-channel signal in response to the calculated signal level sensitivity; in response to the determined similarity being greater than or equal to a predetermined value, controlling, by the controller, the generated center-channel signal to be output; and in response to the determined similarity being less than the predetermined value, controlling, by the controller, the generated center-channel signal not to be output.

The method may further include determining, by the controller, that the similarity between the left-channel signal and the right-channel signal is high or low according to the difference between the size of the left-channel signal and the size of the right-channel signal; and determining, by the controller, that the similarity is low as the difference between the size of the left-channel signal and the size of the right-channel signal increases.

In addition, by controlling the received left-channel signal and right-channel signal to pass through the low pass filter, the signal in the band exceeding the predetermined frequency may be blocked, and the signal in the band below the predetermined frequency may be passed.

In addition, the left-channel signal of the stereo audio signal may be controlled to be output to the first output of the output, the right-channel signal of the stereo audio signal may be controlled to be output to the second output of the output, and the generated center-channel signal may be controlled to be output as the third output of the output.

Advantageous Effects

According to the embodiments, by generating a center-channel signal in a stereo audio apparatus to improve sound reproduction quality, there is an effect of solving the problem of deteriorating the quality of a stereo sound field and a problem of deteriorating intelligibility according to a change in a listener's listening position.

In addition, by implementing a center-channel signal generation algorithm in a time domain, there is an effect of reducing an amount of computation.

MODES OF THE INVENTION

Figure 1:
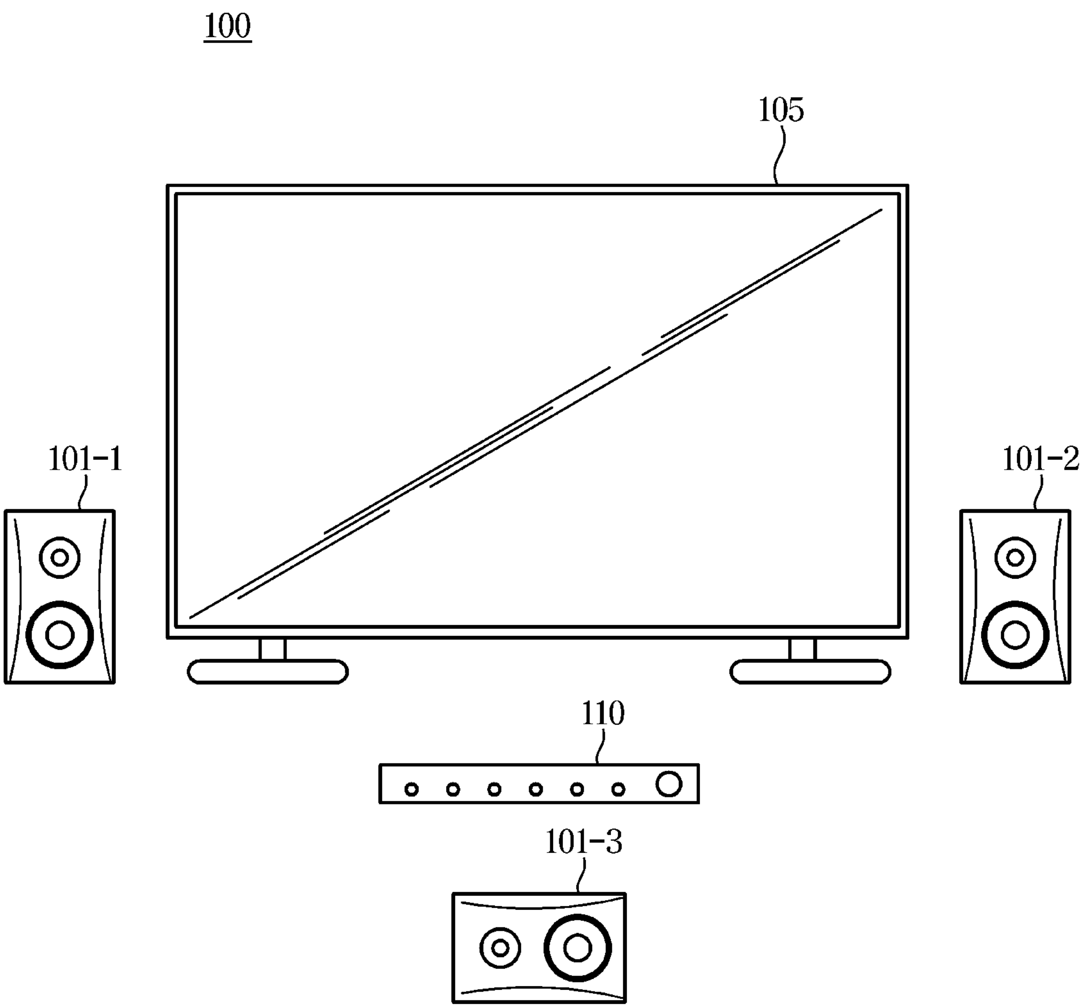
FIG. 1 is a view illustrating a stereo audio system including an audio apparatus according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "— part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, operation principles and embodiments of the disclosure will be described with reference to accompanying drawings.

Figure 2:
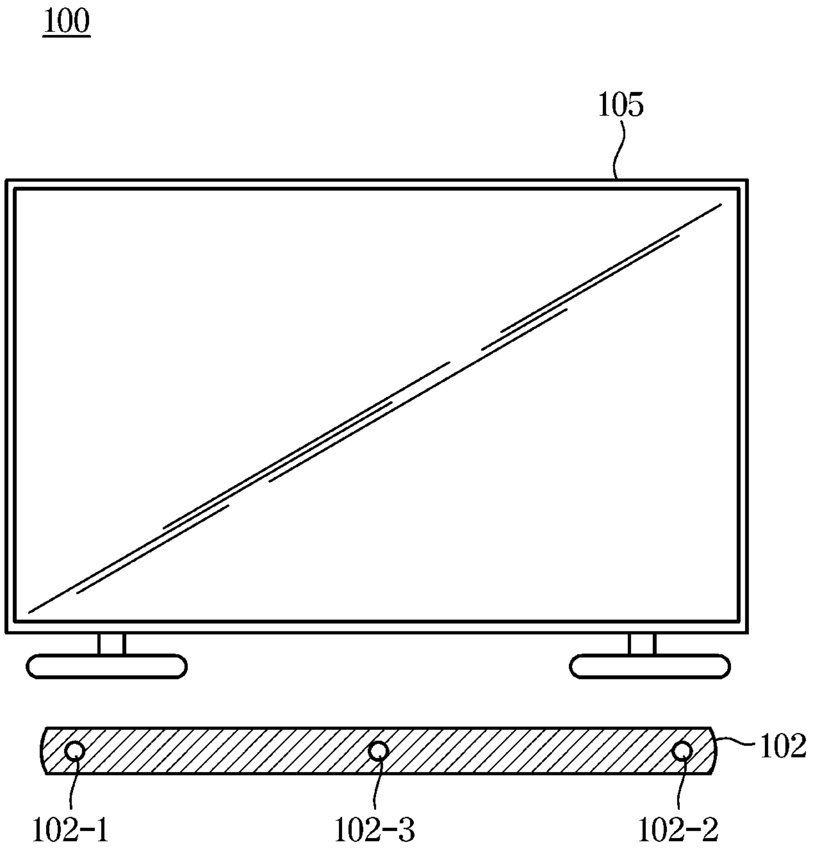
FIG. 2 is a view illustrating a stereo audio system including an audio apparatus according to another embodiment.
Figure 3:
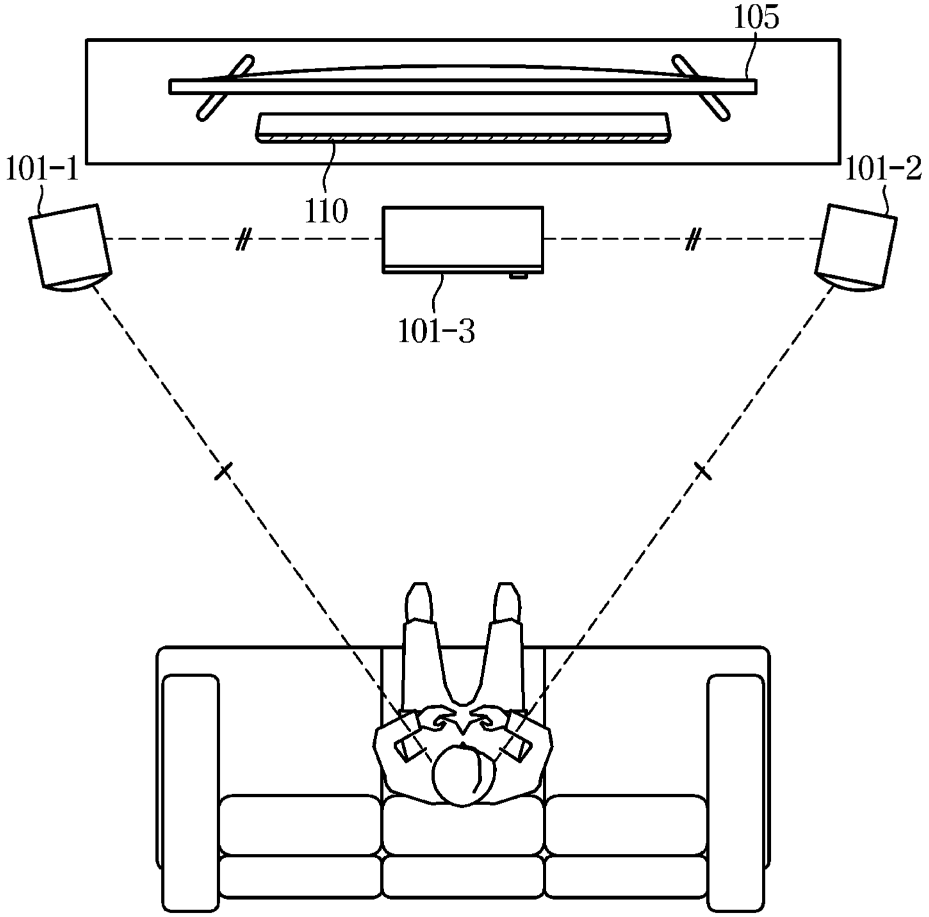
FIG. 3 is a conceptual view illustrating a spatial arrangement condition of a stereo audio system according to an embodiment.

FIG. 1 is a view illustrating a stereo audio system including an audio apparatus according to an embodiment, FIG. 2 is a view illustrating a stereo audio system including an audio apparatus according to another embodiment, and FIG. 3 is a conceptual view illustrating a spatial arrangement condition of a stereo audio system according to an embodiment.

Referring to FIG. 1, a display apparatus 105 of an audio system 100 may be implemented as a television (TV).

The audio system 100 may be implemented in various forms, such as a stereo audio system and a 5.1 channel audio system. Hereinafter, it is assumed that the audio system 100 is the stereo audio system.

The display apparatus 105 may refer to an apparatus that processing an image signal stored in the display apparatus 105 in advance or received from the outside and outputting an image.

When the display apparatus 105 is the TV, it may receive and process a broadcast signal transmitted from a broadcasting station to output the image and sound included in the broadcast signal. Alternatively, it is possible to receive image signals and sound signals from a set-top box.

The TV is basically an image apparatus, but when viewing video content through the TV, not only an image quality but also an audio quality may be an important viewing point. Therefore, audio signal processing for outputting high-quality audio from the TV is as important as video signal processing.

The display apparatus 105 of the audio system 100 is not limited to the TV, and various devices requiring audio signal processing, such as a professional audio device for listening to music or a PC-FI using a laptop/desktop, may be included.

The audio system 100 may include an audio apparatus 110 and a plurality of outputs 101.

The audio apparatus 110 may receive the broadcast signal transmitted from the broadcasting station, process the broadcast signal, and output the broadcast signal as the sound signal. The audio apparatus 110 may include a reproduction function for reproducing a sound source stored in the audio apparatus 110 itself, a CD, or a sound source and contents stored in various storage media.

The audio apparatus 110 may be provided and implemented separately from the display apparatus 105 as illustrated in FIG. 1, or may be implemented as an integral part with the display apparatus 105 as illustrated in FIG. 2.

As a basic means to increase the quality of TV sound, a reproduction method of the stereo audio system is generally widely used.

The stereo audio system may receive a stereo two-channel electrical sound signal, and the electrical sound signals may include a left-channel signal and a right-channel signal, respectively. In general, the stereo electrical sound signal does not include the center-channel signal.

The audio system 100 may include an output 101 for outputting the stereo electrical sound signal received by the audio apparatus 110, and may further include a first output 101-1 for outputting the left-channel signal and a second output 101-2 for outputting the right-channel signal included in the stereo electrical sound signal.

In addition, as will be described later, the audio apparatus 110 may further include a third output 101-3 for outputting the center-channel signal.

The output 101 may be provided in the form of a speaker, as illustrated in FIG. 1. In addition, the output 101 may further include an amplifier.

As illustrated in FIG. 1, the output 101 may be provided with the first output 101-1 to the third output 101-3 in a form of separate speakers. As illustrated in FIG. 1, the output 101 may be provided in the form of an integrated sound-bar 102. The output 102 in the form of the sound-bar may be implemented in a form including all of the first output 102-1 to the third output 102-3.

That is, in the audio system 100 of FIG. 2, the left-channel signal may be output to the first output 102-1 included in the sound-bar, and the right-channel signal may be output to the second output 102-2, and the center-channel signal may be output to the third output 102-3.

The arrangement and configuration of the first outputs 101-1 and 102-1 to the third outputs 101-3 and 102-3 disclosed in FIGS. 1 and 3 may be implemented in various forms according to a design change.

Based on the reproduction method of the audio system 100 that reproduces the stereo audio signal, the quality of reproduced sound is greatly affected according to the size of the apparatuses constituting the system and a spatial arrangement condition of the apparatuses.

In particular, in recent years, since a thickness of the display apparatus 105 itself tends to be reduced, a problem of deteriorating the quality of a stereo sound field has emerged. The quality deterioration problem of the sound signal has several types of patterns, of which 'deterioration of the intelligibility of the stereo sound field' appears as a typical phenomenon. The 'deterioration of the intelligibility of the stereo sound field' appears more prominently in a voice signal.

The quality deterioration problem of the stereo sound field is a phenomenon that occurs when the quality of the sound wave, which is the most central sound wave among a plurality of sound waves constituting the stereo sound field, is deteriorated when the listener who listens to the stereo sound field listens to sound at a specific position.

In the case of the audio system 100 that reproduces the stereo audio signal, based on the spatial position of the listener, when the spatial arrangement condition of the outputs outputting the left-channel signal and the output outputting the right-channel signal are not appropriate, a problem of deterioration of the quality of the stereo sound field occurs.

Referring to FIG. 3, a preferred spatial arrangement condition of the stereo audio system is illustrated.

Referring to FIG. 3, in the case of the stereo audio system, when a distance from the first output 101-1 outputting the left-channel signal to the listener and the distance from the second output 101-2 outputting the right-channel signal are the same, the listener may most clearly listen the audio sound signal.

In addition, when angles between the first output 101-1, the second output 101-2, and the listeners are the same as each other at 60°, the listener may most clearly listen the audio sound signal.

That is, in the case of the stereo audio system, when the spatial arrangement condition between the first output 101-1, the second output 101-2, and the listener's position is satisfied, the audio sound signal may be most clearly listened at the listening position that satisfies the arrangement condition.

However, in recent years, the display apparatus 105 and the audio apparatus 110 having various sizes and shapes have been developed. In the spatial arrangement of the audio system, there are many cases where the arrangement conditions as described in FIG. 3 are not observed.

In the stereo audio system, when the above-described spatial arrangement condition is not observed or the listener's listening position is changed, a left-channel sound wave output from the first output 101-1 and a right-channel sound wave output from the second output 101-2 may not be listened clearly. That is, the quality of the stereo sound field output by the stereo audio system may deteriorate and the intelligibility may decrease.

As described above, the stereo audio system may receive the stereo two-channel electrical sound signal, and the electrical sound signals may include the left-channel signal and the right-channel signal, respectively, but the center-channel signal is not separately provided.

Accordingly, in the stereo audio system, the center-channel signal located in the spatial center may be virtually generated and output based on the left-channel signal and the right-channel signal.

In the stereo audio system, as the generated center-channel signal is output, when the spatial arrangement conditions of the audio system as described above are not observed, or when the listening position of the listener is changed, the quality of the stereo sound field output from the stereo audio system may be deteriorated and the intelligibility may be decreased.

As illustrated in FIG. 3, when a virtual center-channel signal is generated by the audio apparatus 110, the generated center-channel signal may be output through the third output 101-3.

According to the audio apparatus and a method of controlling the audio apparatus of the disclosure, by generating a virtual center-channel signal based on the left-channel signal and the right-channel signal output from the stereo audio system, it is possible to improve a reproduction quality of the stereo sound field.

In addition, when generating the center-channel signal, the audio apparatus 110 may reduce an amount of computation by performing signal processing in the time domain without signal processing the left-channel signal and the right-channel signal in a frequency domain.

Figure 4:
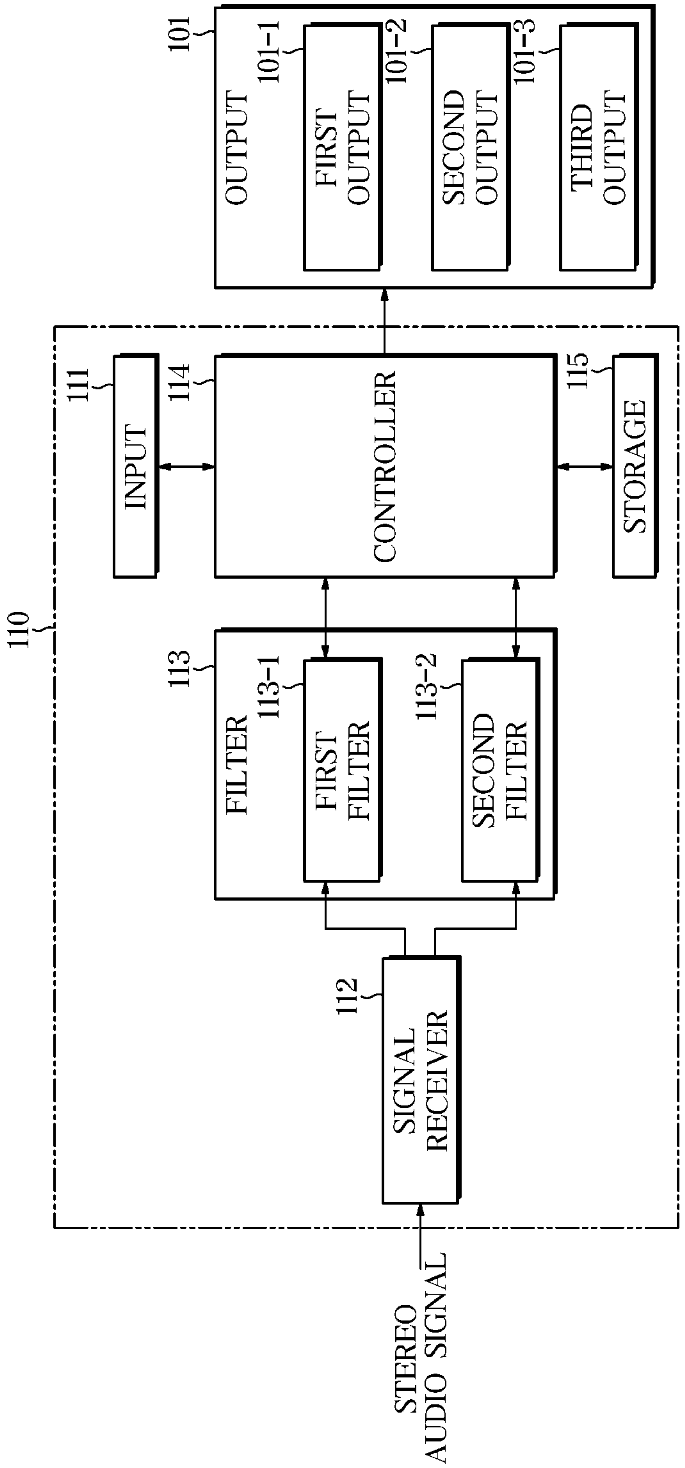
FIG. 4 is a control block diagram of an audio apparatus according to an embodiment.
Figure 5:
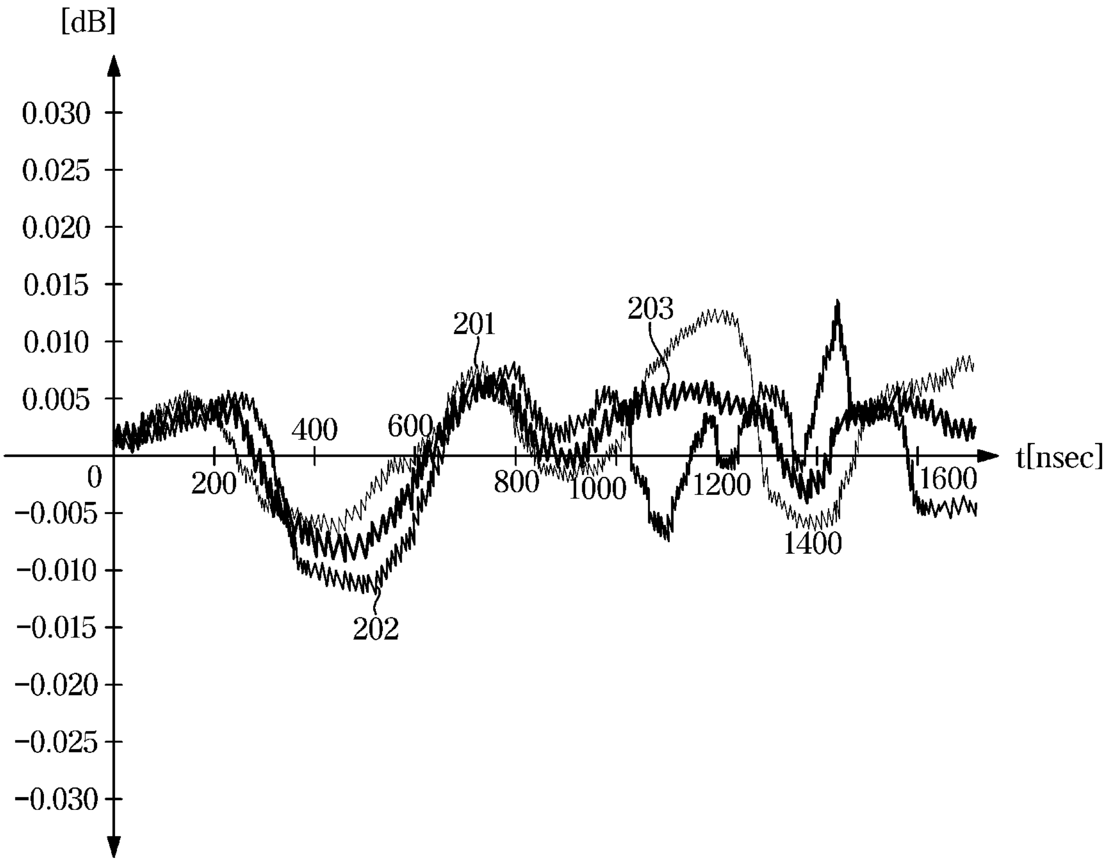
FIG. 5 is a conceptual view illustrating generating a center-channel signal of a stereo audio signal according to an embodiment.
Figure 6:
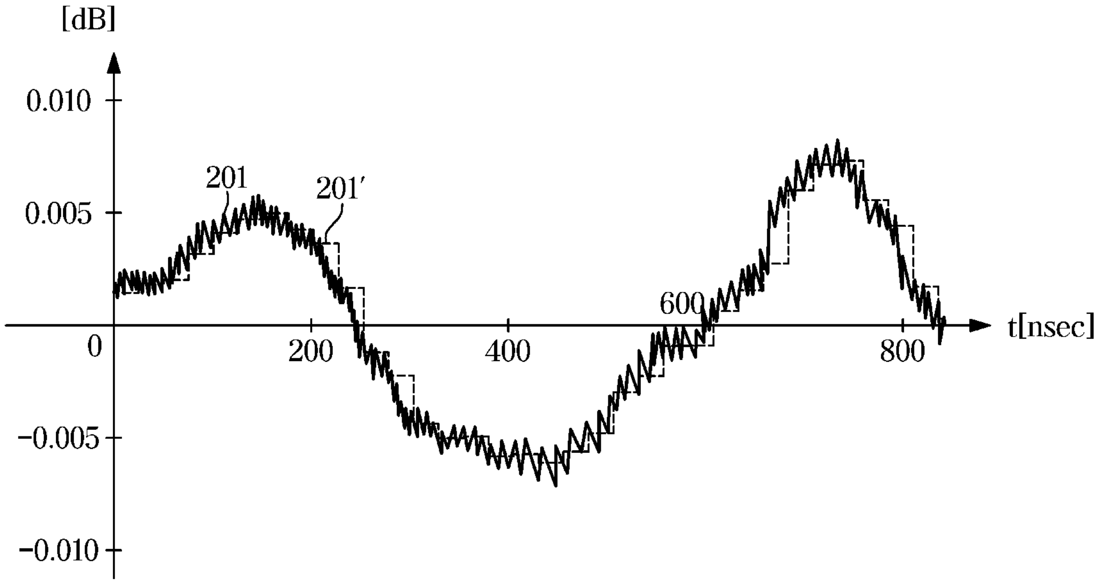
FIG. 6 is a conceptual view illustrating obtaining envelope data of a left-channel signal according to an embodiment.
Figure 7:
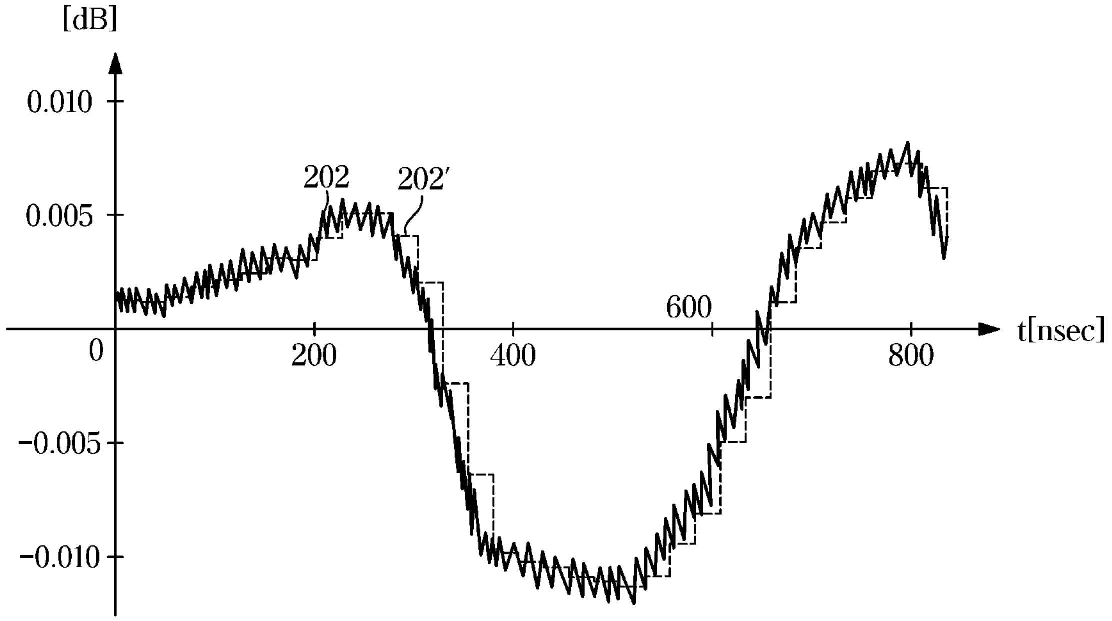
FIG. 7 is a conceptual view illustrating obtaining envelope data of a right-channel signal according to an embodiment.
Figure 8:
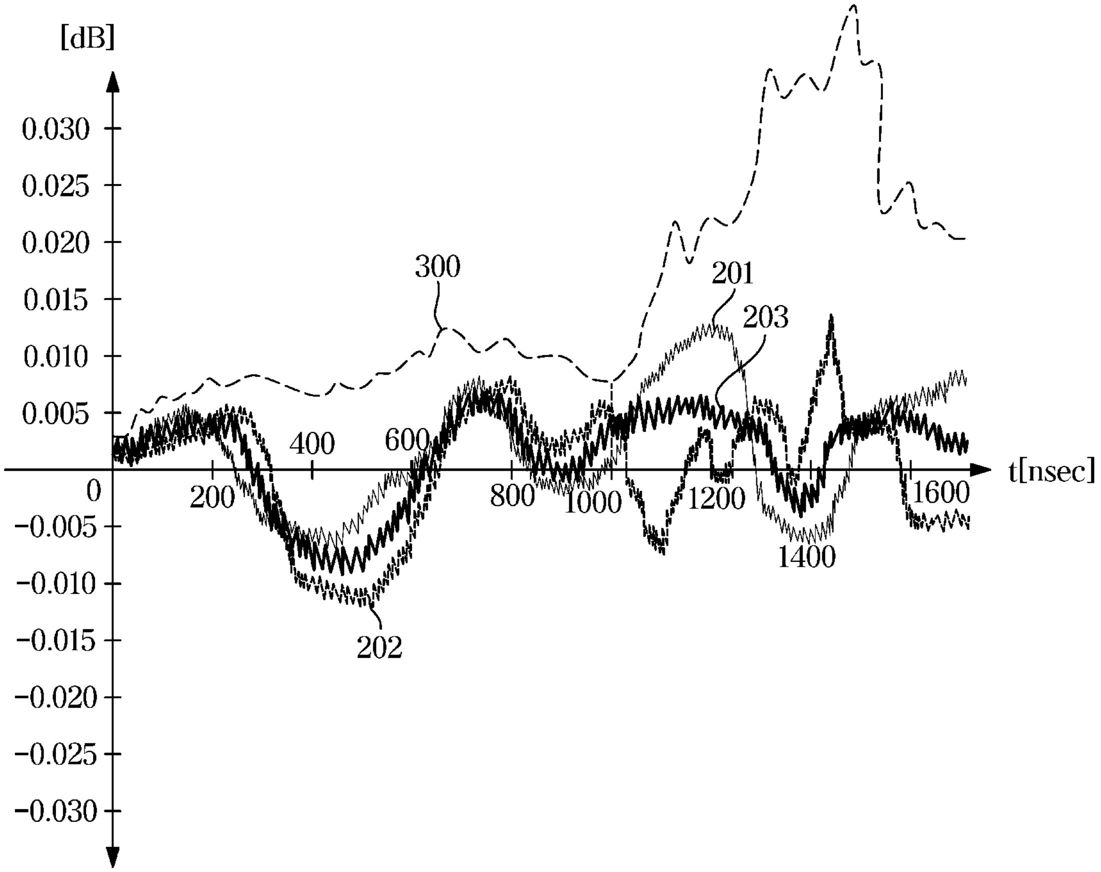
FIG. 8 is a conceptual view illustrating calculating a signal level sensitivity between a left-channel signal and a right-channel signal according to an embodiment.
Figure 9:
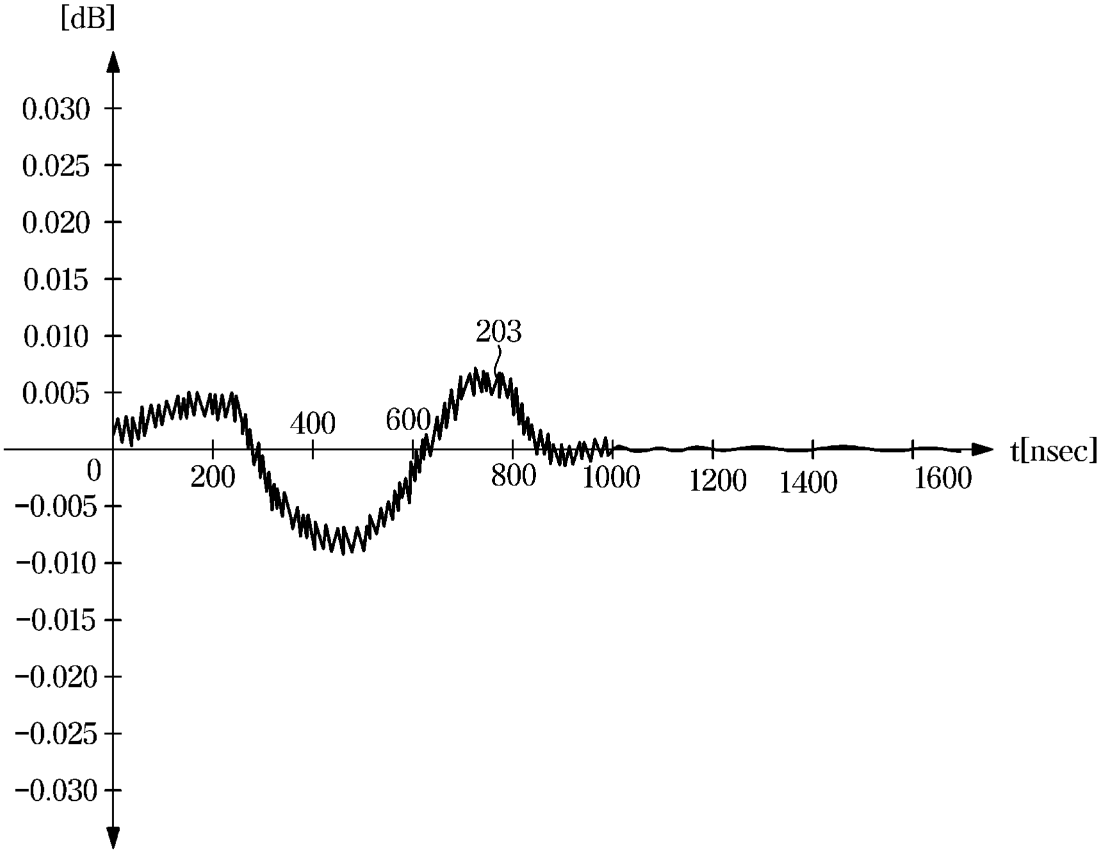
FIG. 9 is a conceptual view illustrating that a center-channel signal generated according to an embodiment is output.

FIG. 4 is a control block diagram of an audio apparatus according to an embodiment, FIG. 5 is a conceptual view illustrating generating a center-channel signal of a stereo audio signal according to an embodiment, FIG. 6 is a conceptual view illustrating obtaining envelope data of a left-channel signal according to an embodiment, FIG. 7 is a conceptual view illustrating obtaining envelope data of a right-channel signal according to an embodiment, FIG. 8 is a conceptual view illustrating calculating a signal level sensitivity between a left-channel signal and a right-channel signal according to an embodiment, and FIG. 9 is a conceptual view illustrating that a center-channel signal generated according to an embodiment is output.

Referring to FIG. 4, the audio apparatus 110 may include an input 111 for receiving a control command for the audio apparatus 110, a signal receiver 112 for receiving the stereo audio signal, and a filter 113 for blocking a signal in a predetermined frequency band of the stereo audio signal, a controller 114 for controlling operations and signal processing of the audio apparatus 110, and a storage 115 for storing data related to the operations and control commands of the audio apparatus 110. In addition, although it is illustrated in FIG. 4 that the output 101 for outputting the stereo audio signal is provided in a separate configuration from the audio apparatus 110, the output 101 may be provided in an integrated configuration with the audio apparatus 110.

The input 111 may be a user interface provided in the audio apparatus 110. The input 111 may include a volume control for a user to set an audio volume. The set volume set by the user through the input 111 may be transmitted to the storage 115 through the controller 114.

Also, the input 111 may receive at least one operation command from the user and transmit an operation signal corresponding to the input at least one operation command to the controller 114.

The input 111 may receive an on/off command of the audio apparatus 110 and may receive a reproduction command for multimedia content to be played through the audio apparatus 110. Also, the input 111 may receive a command to change an volume and frequency of a radio broadcast while performing a radio function.

The signal receiver 112 may receive the stereo audio signal.

The stereo audio signal received by the signal receiver 112 may be a digital signal. That is, the audio apparatus and the method of controlling the audio apparatus of the disclosure will be described on the premise that signal processing is performed in a digital domain.

The stereo audio signal is a two-channel signal, and the electrical sound signal received by the signal receiver 112 may include the left-channel signal and the right-channel signal. That is, the signal receiver 112 may receive the left-channel signal and the right-channel signal of the stereo audio signal. Meanwhile, the audio signal received by the signal receiver 112 may be a signal in which a multi-channel audio signal is received by the audio apparatus 110 and is divided into the left-channel signal and the right-channel signal by down mixing.

In addition, the signal receiver 112 may extract the broadcast signal for each specific frequency (channel) from among various received signals, and appropriately convert the extracted broadcast signal. Particularly, the signal receiver 112 may appropriately convert the broadcast signal received through wired or wireless to display a broadcast image through the display apparatus 105 and output a broadcast sound through the output 101. The signal receiver 112 may be implemented as a tuner.

The filter 113 may filter the stereo audio signal received by the signal receiver 112 to block a signal of a specific frequency band.

Particularly, the filter 113 may include a first filter 113-1 for blocking a signal in a band exceeding a predetermined frequency based on the frequency band of the left-channel signal received by the signal receiver 112, and a second filter 113-2 for blocking the signal in the band exceeding the predetermined frequency based on the frequency band of the right-channel signal received by the signal receiver 112.

The filter 113 may be implemented a low pass filter (LPF) for blocking the signal in the band exceeding the predetermined frequency based on the frequency band of the stereo audio signal and passing the signal in a band below the predetermined frequency.

The predetermined frequency used as a reference for blocking the audio signal by the filter 113 is a cutoff frequency fc, and the cutoff frequency may be 2 [kHz], for example, but may vary according to settings.

That is, in the left-channel signal and the right-channel signal of the stereo audio signal received by the signal receiver 112, the signal in the frequency band exceeding the predetermined cutoff frequency may be blocked by the first filter 113-1 and the second filter 113-2, and may be transmitted to the controller 114 by passing only the signal of the frequency band below the predetermined cutoff frequency.

A reason for blocking the signal in the frequency band exceeding the predetermined frequency among the stereo audio signals using the filter 113 is that signal components of a relatively high frequency band among signals in various frequency bands constituting the audio signal do not have a high similarity between the left-channel signal and the right-channel signal, so it is to be removed signal components before generating the center-channel signal, as described later.

That is, signal components of the high frequency band, which are a factor of an increase in the amount of computation in generating the center-channel signal, are removed in advance through the filter 113, thereby reducing the amount of computation of signal processing.

The storage 115 may store control data and a control program related to control of the audio apparatus 110 according to an embodiment. Particularly, the storage 114 may store a cutoff frequency value for filtering the stereo audio signal, and may also store data on the center-channel signal generated based on the left-channel signal and the right-channel signal that have passed through the filter 113.

In addition, the storage 115 may store data related to an equation for calculating a signal level sensitivity between the left-channel signal and the right-channel signal, as described later, and may store an algorithm for controlling the center-channel signal to be output according to the similarity determined based on the signal level sensitivity between the left-channel signal and the right-channel signal.

The storage 115 may be implemented as at least one of a non-volatile memory device such as a cache, a read only memory (ROM), a programmable ROM (PROM), an erasable programmable ROM (EPROM), an electrically erasable programmable ROM (EEPROM), and a flash memory, a volatile memory device such as a random access memory (RAM), or a storage medium such as a hard disk drive (HDD) or a CD-ROM, but is not limited thereto. The storage 115 may be a memory implemented as a separate chip from a processor described above in relation to the controller 114, or may be implemented with a processor and a single chip.

The controller 114 may oversee the operations and signal processing of the audio apparatus 110. Hereinafter, outputting the center-channel signal of the stereo audio signal generated according to the audio apparatus and the method of controlling the audio apparatus will be described in detail with reference to FIGS. 7 to 9.

The controller 114 may generate the center-channel signal 203 of the stereo audio signal based on a left-channel signal 201 that has passed through the first filter 113-1 and a right-channel signal 202 that has passed through the second filter 113-2.

That is, the controller 114 may generate the virtual center-channel signal 203 based on the left-channel signal 201 and the right-channel signal 202, and may control a signal in the time domain having the high similarity between the left-channel signal 201 and the right-channel signal 202 to be output to the third output 101-3.

Referring to FIG. 5, the controller 114 may generate the center-channel signal 203 of the stereo audio signal based on an average value of a size of the left-channel signal 201 and a size of the right-channel signal 202.

That is, the left-channel signal 201 and the right-channel signal 202 passing through the filter 113 may be expressed as signal waveforms having various sizes (amplitudes) over time. The controller 114 may generate the center-channel signal 203 by calculating an average of the size values of the signals of the left-channel signal 201 and the right-channel signal 202 over time, and may display the generated center-channel signal 203 waveform as a waveform located at the center of the left-channel signal 201 and the right-channel signal 202 as illustrated in FIG. 5.

In order to calculate the level sensitivity between the left-channel signal 201 and the right-channel signal 202 passing through the filter 113, the controller 114 may obtain envelope data 201' of the left-channel signal 201 and envelope data 202' of the -channel signal 202.

That is, the controller 114 may obtain envelope data schematically representing the amplitude change of the left-channel signal 201 and the right-channel signal 202 that change over time.

Various methods in a field of signal processing may be applied as a method of obtaining the envelope data of the left-channel signal 201 and the right-channel signal 202.

In general, in the field of signal processing, as a method of obtaining the envelope data for signal amplitude, signal conversion processing in the frequency domain, such as Cepstrum analysis, may be used. The signal processing in the frequency domain has a problem that a computation process is complicated and the amount of computation increases.

Therefore, in the embodiment of the disclosure, in addition to signal conversion processing in the frequency domain, the controller 114 may obtain approximate amplitude envelope data for the left-channel signal 201 and the right-channel signal 202 by applying a 'sub-windowing processing' method in which a 'windowing processing' method corresponding to signal processing in the time domain is applied.

Particularly, the controller 114 may convert data in which amplitude sizes of the left-channel signal 201 and the right-channel signal 202 passing through the filter 113 change over time into data having a predetermined signal size per unit time, and obtain the envelope data 201' of the left-channel signal 201 and the envelope data 202' of the right-channel signal 202.

The data of the left-channel signal 201 and the right-channel signal 202 illustrated in FIGS. 6 and 7 may obtain the envelope data for signal data corresponding to a predetermined time domain among the data of the left-channel signal 201 and the right-channel signal 202 illustrated in FIG. 5.

Referring to FIG. 6, the controller 114 may obtain the data of the signal size (amplitude) per predetermined unit time in the time domain of the left-channel signal 201 passing through the filter 113 as an approximation value of a predetermined range to obtain the envelope data 201' of the left-channel signal 201.

Likewise, referring to FIG. 7, the controller 114 may obtain the data of the signal size (amplitude) per predetermined unit time in the time domain of the right-channel signal 202 passing through the filter 113 as an approximation value of a predetermined range to obtain the envelope data 202' of the right-channel signal 202.

The controller 114 may calculate the signal level sensitivity between the left-channel signal 201 and the right-channel signal 202 based on the envelope data 201' of the left-channel signal 201 and the envelope data 202' of the right-channel signal 202.

Particularly, the controller 114 may calculate a difference value of the signal size by time of the envelope data 201' of the left-channel signal 201 and the envelope data 202' of the right-channel signal 202, apply an absolute value to the calculated difference value, and calculate the signal level sensitivity between the left-channel signal 201 and the right-channel signal 202 by smoothing the data to which the absolute value is applied according to a predetermined filtering coefficient.

That is, the controller 114 may calculate the signal level sensitivity between the left-channel signal 201 and the right-channel signal 202 based on Equation 1 below.

$$\text{signal level sensitivity}=\alpha\cdot H[\text{abs}\{H(X_{left\text{-}ch}[n])_{Approximated\ envelope}-H(X_{right\text{-}ch}[n])_{Approximated\ envelope}\}]_{Smooth}$$ [Equation 1]

In this case, 'α' is a correction factor for the signal level sensitivity and may be a value in the range of $0.5<\alpha<1.0$. In addition, '$X_{left\text{-}ch}[n]$' is the left-channel signal 201, '$X_{right\text{-}ch}[n]$' is the right-channel signal 202, and '$H_{Approximated\ envelope}$' represents the envelope data obtained for the left-channel signal 201 and the right-channel signal 202. 'abs' is a signal processing coefficient for applying the absolute value to the difference in signal size over time between the envelope data 201' of the left-channel signal 201 and the envelope data 202' of the right-channel signal 202. '$H_{Smooth}$' is a signal processing coefficient to generate continuous signal level sensitivity data by smoothing the absolute value data obtained based on the envelope data of the left-channel signal 201 and the right-channel signal 202 according to the predetermined filtering coefficient. In other words, the '$H_{Smooth}$' is a kind of low pass filter.

That is, the controller 114 may calculate the signal level sensitivity 300 between the left-channel signal 201 and the right-channel signal as illustrated in FIG. 8 by applying a signal processing step of Equation 1 to the envelope data obtained by the method described in FIGS. 6 and 7.

The signal level sensitivity 300 waveform illustrated in FIG. 8 is a graph shape a similarity between the left-channel signal 201 and the right-channel signal 202 based on the above-described method.

In the audio apparatus 100, as illustrated in FIG. 8, when the similarity between the left-channel signal 201 and the right-channel signal 202 is high, the value of the signal level sensitivity 300 is displayed relatively low. When the similarity between the left-channel signal 201 and the right-channel signal 202 is low, the value of the signal level sensitivity 300 is displayed relatively high. However, the shape of the signal level sensitivity 300 displayed according to the similarity between the left-channel signal 201 and the right-channel signal 202 may vary depending on a setting, and may be displayed differently as Equation 1 is changed.

The controller 114 may determine the similarity between the left-channel signal 201 and the right-channel signal 202 based on the signal level sensitivity 300 between the left-channel signal 201 and the right-channel signal 202. As illustrated in FIG. 8, it can be seen that the value of the signal level sensitivity 300 is a relatively low value calculated before 1000 nsec, and a relatively high value calculated after 1000 nsec based on the point at which the time is 1000 nsec.

Based on the calculated signal level sensitivity 300, the controller 114 may determine that the similarity between the left-channel signal 201 and the right-channel signal 202 is relatively high before the time is 1000 nsec, and may determine that the similarity between the left-channel signal 201 and the right-channel signal 202 is relatively low after the time is 1000 nsec.

When the calculated signal level sensitivity 300 is low, the controller 114 may determine that the similarity between the left-channel signal 201 and the right-channel signal 202 is high. When the calculated signal level sensitivity 200 is high, the controller 114 may determine that the similarity between the left-channel signal 201 and the right-channel signal 202 is low.

That is, the controller 114 may determine that the similarity between the left-channel signal 201 and the right-channel signal 202 is high and low according to the difference between the size of the left-channel signal 201 and the size of the right-channel signal 202, and may determine that the similarity is lower as the difference between the size of the left-channel signal 202 and the size of the right-channel signal 202 increases.

The controller 114 may control the center-channel signal 203 generated in advance to be output based on the determined value of the similarity between the left-channel signal 201 and the right-channel signal 202.

That is, when the similarity between the left-channel signal 201 and the right-channel signal 202 is greater than or equal to the predetermined value, the controller 114 may control the center-channel signal 203 generated in advance to be output in the corresponding time domain. When the similarity between the left-channel signal 201 and the right-channel signal 202 is less than the predetermined value, the controller 114 may control the center-channel signal 203 generated in advance not to be output in the corresponding time domain.

The Data on a predetermined reference value for determining the similarity between the left-channel signal 201 and the right-channel signal 202 may be stored in the storage 115.

Referring to FIG. 9, the controller 114 may control so that the center-channel signal 203 generated by the method described above in FIG. 5 is output in the time domain before a specific point in time tx, and may control so that the center-channel signal 203 is hardly output after the specific point in time tx.

That is, as illustrated in FIG. 8, since the similarity between the left-channel signal 201 and the right-channel signal 202 is relatively high before 1000 nsec, which is the specific point in time tx in the time domain, the controller 114 may control the center-channel signal 203 generated in advance to be output, and after 1000 nsec, since the similarity between the left-channel signal 201 and the right-channel signal 202 is relatively low, the controller 114 may control the center-channel signal 203 generated in advance not to be output.

As described above, the stereo audio system 100 including the audio apparatus 110 may output the center-channel signal 203 generated based on the left-channel signal 201 and the right-channel signal 202 received by the signal receiver 112, thereby solving problems of deterioration in quality and intelligibility of the sound signal output from the stereo audio system.

Since the center-channel signal 203 generated in the time domain with a low similarity between the left-channel signal 201 and the right-channel signal 202 of the stereo audio signal does not improve the sound quality of the stereo audio system, the controller 114 may control to output only the center-channel signal 203 generated in the time domain having a high similarity between the left-channel signal 201 and the right-channel signal 202.

The controller 114 may control the left-channel signal 201 of the stereo audio signal to be output as the first output 101-1, control the right-channel signal 202 to be output as the second output 101-2, and may control the center-channel signal 203 in the time domain having the high similarity between the left-channel signal 201 and the right-channel signal 202 to be output as the third output 101-3.

Figure 10:
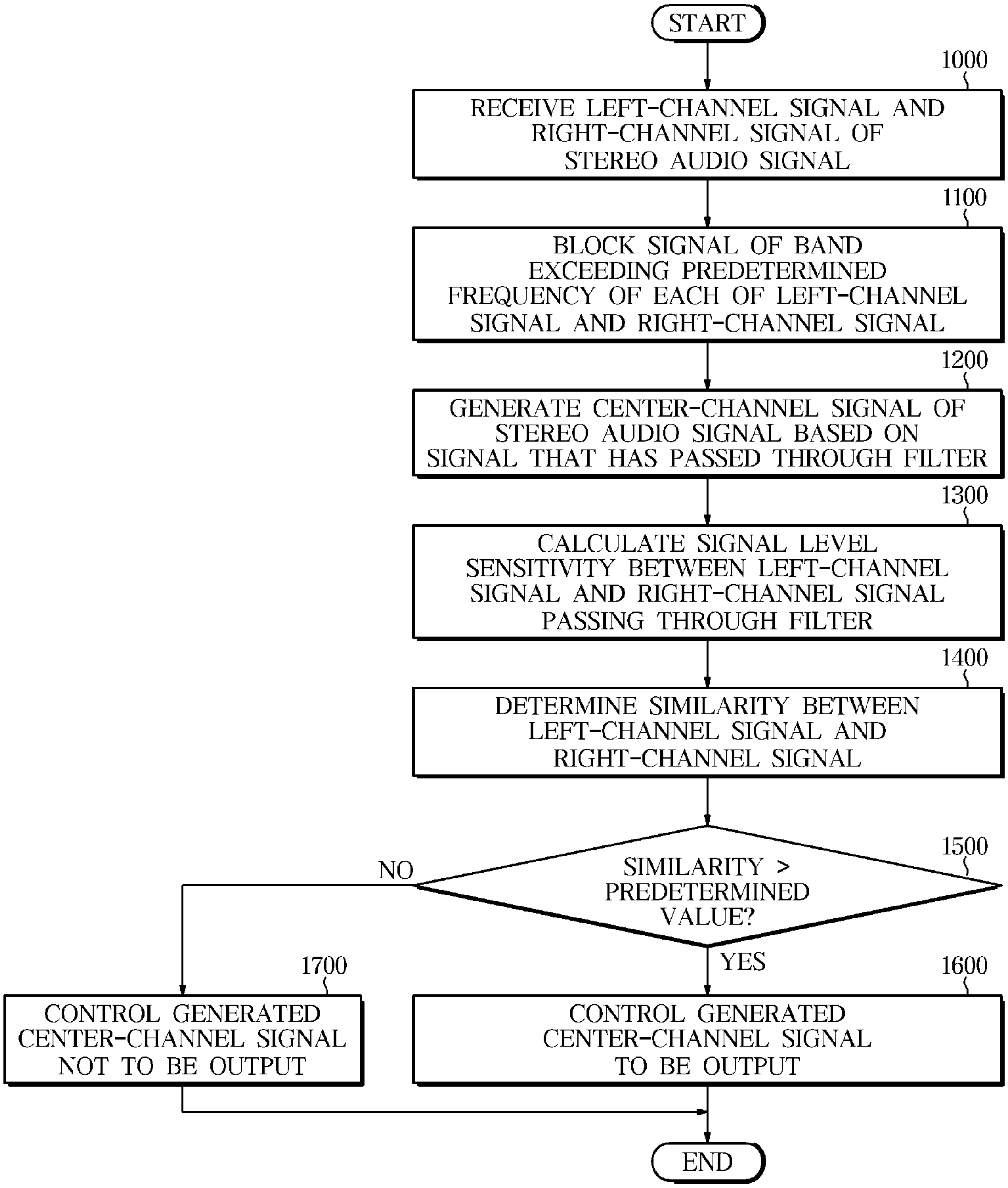
FIGS. 10 and 11 are flowcharts illustrating a method of controlling an audio apparatus according to an embodiment.
Figure 11:
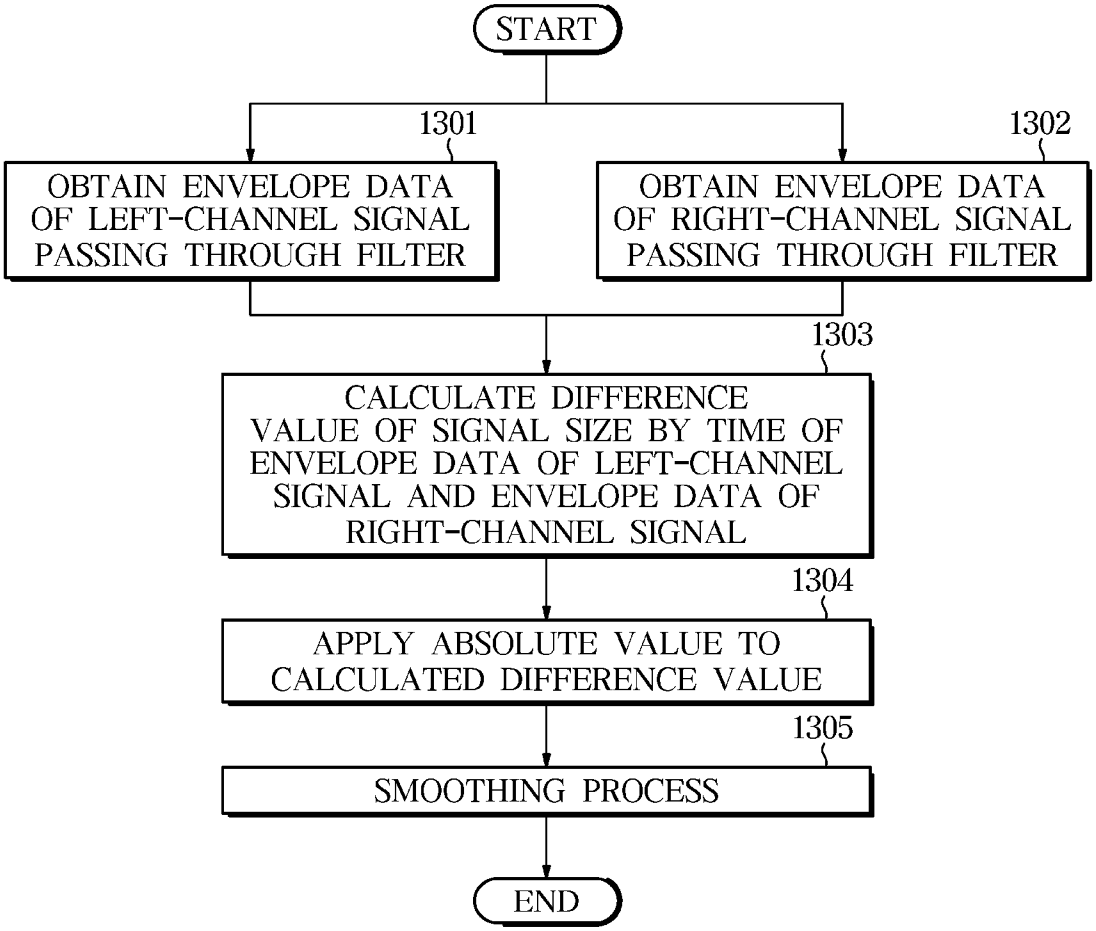

FIGS. 10 and 11 are flowcharts illustrating a method of controlling an audio apparatus according to an embodiment.

Referring to FIG. 10, the signal receiver 112 may receive the left-channel signal 201 and the right-channel signal 202 of the stereo audio signal (1000).

The signal of the band exceeding the predetermined frequency of each of the received left-channel signal 201 and right-channel signal 202 may pass through the filter 113 and be blocked (1100).

That is, the first filter 113-1 may block the signal in the band exceeding the predetermined frequency of the left-channel signal 201 received by the signal receiver 112, and the second filter 113-2 may block the signal in the band exceeding the predetermined frequency of the right-channel signal 202 received by the signal receiver 112.

The controller 114 may generate the center-channel signal 203 of the stereo audio signal based on the left-channel signal 201 that has passed through the first filter 113-1 and the right-channel signal 202 that has passed through the second filter 113-2 (1200).

That is, the controller 114 may generate the center-channel signal of the stereo audio signal based on the average value of the size of the left-channel signal and the size of the right-channel signal.

The controller 114 may calculate the signal level sensitivity 300 between the left-channel signal 201 and the right-channel signal 202 passing through the filter 113 (1300).

Particularly, referring to FIG. 11, in order to calculate the level sensitivity between the left-channel signal 201 and the right-channel signal 202 passing through the filter 113, the controller 114 may obtain the envelope data 201' of the left-channel signal 201 (1301), and may obtain the envelope data 202' of the right-channel signal 202 (1302).

That is, the controller 114 may convert data in which the amplitude sizes of the left-channel signal 201 and the right-channel signal 202 passing through the filter 113 change over time into data having the predetermined signal size per unit time, and obtain the envelope data 201' of the left-channel signal 201 and the envelope data 202' of the right-channel signal 202.

The controller 114 may calculate a difference value of the signal size by time of the envelope data 201' of the left-channel signal 201 and the envelope data 202' of the right-channel signal 202 (1303), apply the absolute value to the calculated difference value (1304), and calculate the signal level sensitivity between the left-channel signal 201 and the right-channel signal 202 by smoothing the data to which the absolute value is applied according to the predetermined filtering coefficient (1305).

The controller 114 may determine the similarity between the left-channel signal 201 and the right-channel signal 202 based on the signal level sensitivity 300 between the left-channel signal 201 and the right-channel signal 202 (1400).

When the calculated signal level sensitivity 300 is low, the controller 114 may determine that the similarity between the left-channel signal 201 and the right-channel signal 202 is high. When the calculated signal level sensitivity 200 is high, the controller 114 may determine that the similarity between the left-channel signal 201 and the right-channel signal 202 is low.

The controller 114 may determine whether the similarity between the left-channel signal 201 and the right-channel signal 202 is equal to or greater than a predetermined value (1500).

That is, when the similarity between the left-channel signal 201 and the right-channel signal 202 is greater than or equal to the predetermined value, the controller 114 may control the center-channel signal 203 generated in advance to be output in the corresponding time domain (1600). When the similarity between the left-channel signal 201 and the right-channel signal 202 is less than the predetermined value, the controller 114 may control the center-channel signal 203 generated in advance not to be output in the corresponding time domain (1700).

As described above, the stereo audio apparatus 110 may generate the center-channel signal 203, and may output the center-channel signal 203 based on the similarity between the left-channel signal 201 and the right-channel signal 202, thereby improving the sound reproduction quality, and solving the problems of deterioration in reproduction quality and reduction of intelligibility.

In addition, the stereo audio apparatus 110 may have an effect of reducing the amount of computation by determining the similarity between the left-channel signal 201 and the right-channel signal 202 for outputting the center-channel signal 203 in the time domain.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

The invention claimed is:

1. An audio apparatus comprising:

a signal receiver configured to receive a left-channel signal and a right-channel signal of a stereo audio signal;

at least one filter configured to block a signal in a band exceeding a predetermined frequency based on frequency bands of each of the received left-channel signal and right-channel signal; and a controller configured to:

generate a center-channel signal of the stereo audio signal based on the left-channel signal and the right-channel signal passing through the filter, calculate a signal level sensitivity between the left-channel signal and the right-channel signal passing through the filter, determine a similarity between the left-channel signal and the right-channel signal based on the calculated signal level sensitivity, and control the generated center-channel signal to be output in response to the determined similarity, wherein the controller is configured to:

obtain envelope data of the left-channel signal based on a size of the left-channel signal passing through the filter, obtain envelope data of the right-channel signal based on a size of the right-channel signal passing through the filter, calculate a difference value between a signal size by time of the envelope data of the left-channel signal and a signal size by time of the envelope data of the right-channel signal, apply an absolute value to the calculated difference value, and calculate the signal level sensitivity between the left-channel signal and the right-channel signal by smoothing the envelope data to which the absolute value is applied according to a predetermined filtering coefficient.

2. The audio apparatus according to claim 1, wherein the controller is configured to generate the center-channel signal of the stereo audio signal based on an average value of the size of the left-channel signal passing through the filter and the size of the right-channel signal passing through the filter.

3. The audio apparatus according to claim 1, wherein the controller is configured to convert data in which the size of the left-channel signal and the size of the right-channel signal passing through the filter changes over time into data having a predetermined signal size per unit time, and to obtain the envelope data of the left-channel signal and the envelope data of the right-channel signal.

4. The audio apparatus according to claim 1, wherein the controller is configured to:

determine the similarity between the left-channel signal and the right-channel signal in response to the calculated signal level sensitivity;

in response to the determined similarity being greater than or equal to a predetermined value, control the generated center-channel signal to be output; and in response to the determined similarity being less than the predetermined value, control the generated center-channel signal not to be output.

5. The audio apparatus according to claim 1, wherein the controller is configured to:

determine that the similarity between the left-channel signal and the right-channel signal is high or low according to a difference between the size of the left-channel signal and the size of the right-channel signal; and determine that the similarity is low as the difference between the size of the left-channel signal and the size of the right-channel signal increases.

6. The audio apparatus according to claim 1, wherein the at least one filter comprises a low pass filter configured to block the signal in the band exceeding the predetermined frequency based on the frequency bands of each of the left-channel signal and the right-channel signal, and to pass a signal in a band below the predetermined frequency.

7. The audio apparatus according to claim 1, further comprising:

an output configured to output the received stereo audio signal.

8. The audio apparatus according to claim 7, wherein the output comprises:

a first output configured to outputting the left-channel signal of the stereo audio signal;

a second output configured to output the right-channel signal of the stereo audio signal; and a third output configured to output the generated center-channel signal.

9. A method of controlling an audio apparatus, the method comprising:

receiving, by a signal receiver, a left-channel signal and a right-channel signal of a stereo audio signal;

blocking, by a filter, a signal in a band exceeding a predetermined frequency based on frequency bands of each of the received left-channel signal and right-channel signal;

generating, by a controller, a center-channel signal of the stereo audio signal based on the left-channel signal and the right-channel signal passing through the filter;

obtaining, by the controller, envelope data of the left-channel signal based on a size of the left-channel signal passing through the filter;

obtaining, by the controller, envelope data of the right-channel signal based on a size of the right-channel signal passing through the filter;

calculating, by the controller, a difference value between a signal size by time of the envelope data of the left-channel signal and a signal size by time of the envelope data of the right-channel signal;

applying, by the controller, an absolute value to the calculated difference value;

calculating, by the controller, a signal level sensitivity between the left-channel signal and the right-channel signal by smoothing the envelope data to which the absolute value is applied according to a predetermined filtering coefficient;

determining, by the controller, a similarity between the left-channel signal and the right-channel signal based on the calculated signal level sensitivity; and controlling, by the controller, the generated center-channel signal to be output in response to the determined similarity.

10. The method according to claim 9, wherein the generating of the center-channel signal of the stereo audio signal comprises:

generating the center-channel signal of the stereo audio signal based on an average value of the size of the left-channel signal passing through the filter and the size of the right-channel signal passing through the filter.

11. The method according to claim 9, wherein the obtaining of the envelope data of the left-channel signal and the obtaining of the envelope data of the right-channel signal comprise:

converting data in which the size of the left-channel signal and the size of the right-channel signal passing through the filter changes over time into data having a predetermined signal size per unit time; and obtaining the envelope data of the left-channel signal and the envelope data of the right-channel signal.

* * * * *